(12) United States Patent
Villarreal et al.

(10) Patent No.: US 11,384,830 B2
(45) Date of Patent: Jul. 12, 2022

(54) WINDOW DESIGN FOR A DIFFERENTIAL HOUSING

(71) Applicant: TOYOTA MOTOR ENGINEERING & MANUFACTURING NORTH AMERICA, INC., Plano, TX (US)

(72) Inventors: Jaret Villarreal, Ypsilanti, MI (US); Reika Mikami, Novi, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/533,280

(22) Filed: Aug. 6, 2019

(65) Prior Publication Data

US 2021/0041016 A1 Feb. 11, 2021

(51) Int. Cl.
| | |
|---|---|
| F16H 57/03 | (2012.01) |
| F16H 48/40 | (2012.01) |
| F16H 57/037 | (2012.01) |
| F16H 48/08 | (2006.01) |
| F16H 57/02 | (2012.01) |

(52) U.S. Cl.
CPC .......... *F16H 57/037* (2013.01); *F16H 48/08* (2013.01); *F16H 2057/02026* (2013.01); *F16H 2057/02091* (2013.01)

(58) Field of Classification Search
CPC ........ F16H 48/40; F16H 48/08; F16H 57/037; F16H 2057/02026; F16H 2057/02091; F16H 2048/382; F16H 2048/385; F16H 2048/085; F16H 2048/082
See application file for complete search history.

(56) References Cited

U.S. PATENT DOCUMENTS

| | | | |
|---|---|---|---|
| 5,951,431 A | 9/1999 | Downs et al. | |
| 6,116,108 A * | 9/2000 | Sturm | F16H 48/08 29/525 |
| 7,320,659 B2 | 1/2008 | Pritchard et al. | |
| 7,736,257 B2 * | 6/2010 | Nakajima | F16H 48/22 475/230 |
| 7,780,565 B2 * | 8/2010 | Fusegi | F16H 48/34 475/230 |
| 7,827,882 B2 | 11/2010 | Kohno et al. | |
| 7,867,126 B2 * | 1/2011 | Nakajima | F16H 48/08 475/160 |

(Continued)

*Primary Examiner* — Luis A Gonzalez
(74) *Attorney, Agent, or Firm* — Haynes and Boone, LLP

(57) ABSTRACT

A differential assembly including a differential housing, a gear assembly, a shaft, and a ring gear. The differential housing generally includes a peripheral wall, first and second end walls connected to the peripheral wall and spaced apart along a rotational axis so that the peripheral wall and the first and second end walls, in combination, define an internal cavity, a transitional region defined in the differential housing where the second end wall meets the peripheral wall, and a first window formed through the peripheral wall, the transitional region, and/or the second end wall and into the internal cavity, the first window including a central portion and first and second ear portions adjoining the central portion and extending outwardly therefrom. The first window defines a shape when projected perpendicularly onto a first plane including both the rotational axis and a pinion axis, said pinion axis extending perpendicular to the rotational axis.

24 Claims, 14 Drawing Sheets

(56) References Cited

U.S. PATENT DOCUMENTS

| | | | |
|---|---|---|---|
| 7,976,421 B2* | 7/2011 | Nakajima | F16H 48/08 |
| | | | 475/230 |
| 8,747,275 B2 | 6/2014 | Shioiri et al. | |
| 9,388,893 B1* | 7/2016 | Eckart | B60B 35/166 |
| 9,458,919 B2 | 10/2016 | Yanase | |
| 9,822,863 B2 | 11/2017 | Chida et al. | |
| 2017/0350490 A1 | 12/2017 | Sudou | |
| 2019/0003571 A1 | 1/2019 | Okumoto et al. | |

* cited by examiner

WINDOW DESIGN FOR A DIFFERENTIAL HOUSING

TECHNICAL FIELD

The present application relates generally to a differential assembly, and, more particularly, to window design for a differential housing of a differential assembly.

BACKGROUND

A differential assembly is used to transmit mechanical power from a vehicle's transmission to a pair of drive wheels. The differential assembly contains a pair of beveloid gear sets configured to allow the vehicle to execute a turning maneuver without any slippage of the drive wheels. Without the differential assembly, the drive wheels would be forced to turn at the same rate, regardless of their individual trajectories, which trajectories, at least during the execution of the turning maneuver, are different for each of the drive wheels. The beveloid gear sets are housed within an internal cavity of the differential housing. The differential housing includes a pair of windows that provide access to the internal cavity. During assembly, the beveloid gear sets are placed into the differential housing through the window(s).

To increase the overall efficiency of the vehicle (among other things), it is desirable to reduce the mass of the differential housing as much as possible. The mass of a conventional differential housing can be reduced by decreasing the overall size of the housing itself. However, such an overall size reduction is often difficult to achieve while maintaining torque requirements. Accordingly, any reduction in the overall size of the differential housing must be justified by confirming that the corresponding stress increase in the part under loading is negligible or acceptable. In addition, or instead, the mass of a conventional differential housing may be reduced by uniformly increasing the size of the window(s). However, removing mass uniformly around the window(s) fails to account for the varying stress concentrations that occur in different regions of the differential housing. Therefore, what is needed is an apparatus, system, and/or method that addresses one or more of the foregoing issues and/or one or more other issues.

DETAILED DESCRIPTION

The present disclosure provides a unique differential housing that accounts for non-uniform stress concentration around the window(s) by targeting mass-reduction specifically to areas of relatively low stress concentration. In this regard, stress concentrations around the window(s) are greater near the ring gear attachment and smaller near the end of the differential housing opposite the ring gear attachment. For this reason, among others, mass removal is targeted toward the end of the differential housing opposite the ring gear attachment. More particularly, the removed portions of the differential assembly window(s) are made to look like "ears" protruding from adjacent corners of the window(s). By targeting mass-reduction specifically to areas of relatively low stress concentration, a similar amount of mass can be removed from the differential housing as that removed using conventional methods (e.g., reduction in overall size and/or uniform material removal around the window(s)) while, at the same time, a lower maximum stress is maintained in the regions surrounding the window(s). Alternatively, a greater amount of mass can be removed from the differential housing than that removed using conventional methods while, at the same time, a similar increase in stress is maintained in the regions surrounding the window(s). As a result, the differential housing decreases mass, reduces cost, and increases overall vehicle efficiency while maintaining a structural integrity that does not sacrifice torque requirements. Moreover, the unique window(s) of the differential housing make assembly of the differential assembly's internal components easier and/or more efficient by offering unique location(s) for finger placement and/or machine access during the assembly process.

Figure 1:
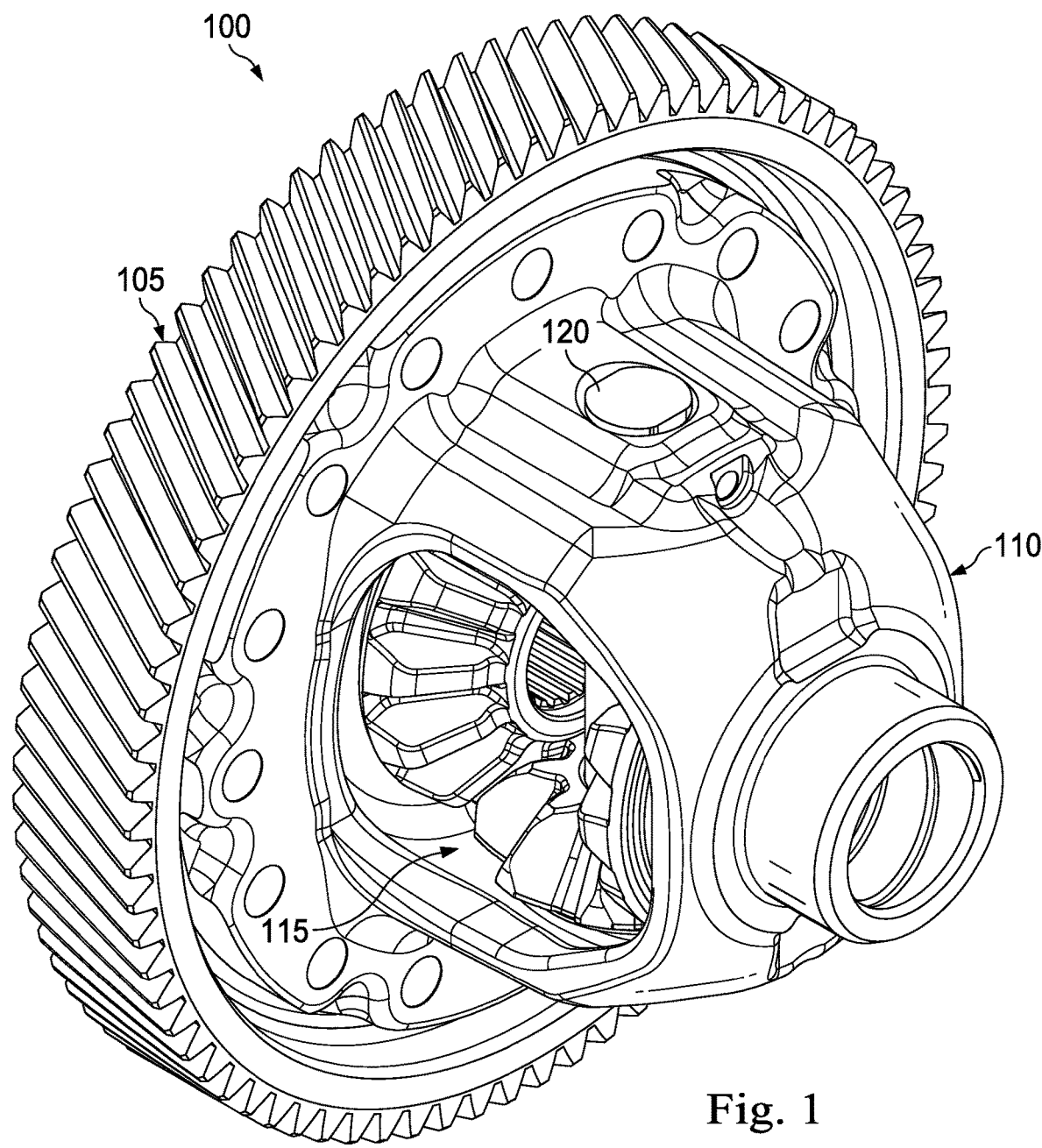
FIG. 1 is a perspective view of a differential assembly including a ring gear, a first differential housing, a gear assembly, and a shaft, according to one or more embodiments of the present disclosure.

Referring to FIG. 1, in an embodiment, a differential assembly is generally referred to by the reference numeral 100. Among other functions, the differential assembly 100 transmits power from the vehicle's engine to the drive wheels, acts as a final gear reduction by slowing the rotational speed of the vehicle's transmission one final time before it reaches the drive wheels, and transmits power to the drive wheels while, at the same time, allowing the drive wheels to rotate at different speeds (e.g., when the vehicle executes a turning maneuver). The differential assembly 100 includes a ring gear 105, a differential housing 110, a gear assembly 115, and a shaft 120. The ring gear 105 receives engine power from the vehicle's transmission and is attached to the differential housing 110. The differential housing 110 houses the gear assembly 115 and the shaft 120. The gear assembly 115 and the shaft 120 transmit the engine power received from the transmission to the drive wheels, as will be described in further detail below.

Figure 2:
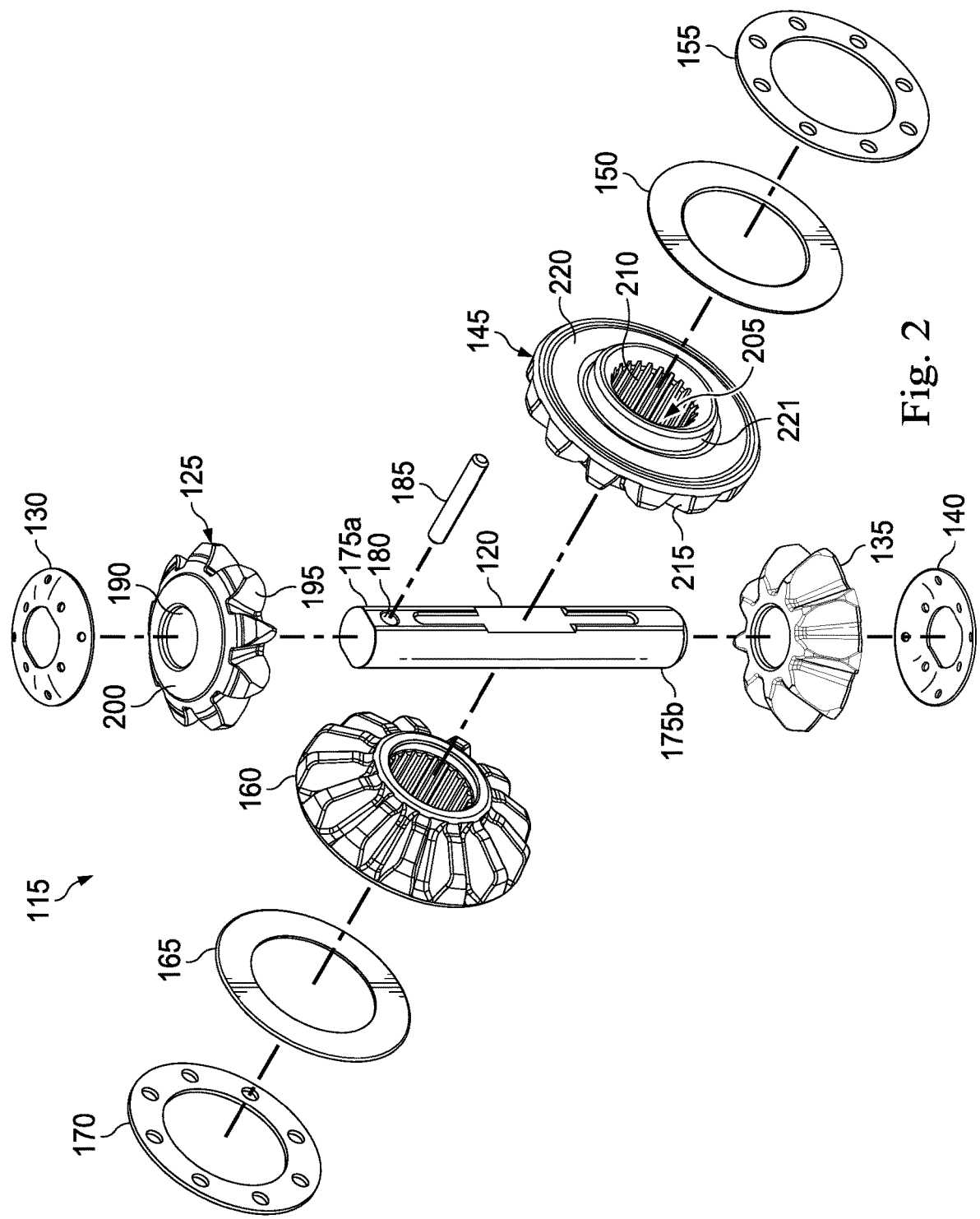
FIG. 2 is an exploded perspective view of the gear assembly and the shaft of FIG. 1, according to one or more embodiments of the present disclosure.

Referring to FIG. 2, with continuing reference to FIG. 1, in an embodiment, the gear assembly 115 includes a pinion gear 125, a washer 130, a pinion gear 135, a washer 140, a side gear 145, a bearing 150, a washer 155, a side gear 160, a bearing 165, and a washer 170. The shaft 120 includes opposing end portions 175a and 175b. An opening 180 is formed transversely through the shaft 120 at the end portion 175a. A pin 185 is adapted to be accommodated within the opening 180 to secure the shaft 120 to the differential housing 110. The opposing end portions 175a and 175b of the shaft 120 are adapted to support the pinion gears 125 and 135. In this regard, a central passage 190 is formed through the pinion gear 125 to accommodate the end portion 175a of the shaft 120. The pinion gear 125 includes gear teeth 195. In some embodiments, the gear teeth 195 are beveled. A bearing surface 200 is formed in the pinion gear 125, opposite the gear teeth 195. In some embodiments, the bearing surface 200 is spherical. The washer 130 is adapted to mate with the bearing surface 200 of the pinion gear 125 to accommodate rotation and/or thrust applied to the pinion gear 125 during operation. In some embodiments, the pinion gear 135 and the washer 140 are identical to the pinion gear 125 and the washer 130, respectively, and, therefore, will not be described in further detail.

The side gears 145 and 160 are each adapted to mate with both of the pinion gears 125 and 135 and to transmit torque to the drive wheels of the vehicle. In this regard, a central passage 205 is formed through the side gear 145 to facilitate coupling of the side gear 145 to a right-side drive wheel of the vehicle via a shaft. Alternatively, the central passage 205 may facilitate coupling of the side gear 145 to a left-side drive wheel of the vehicle via a different shaft. In either case, an internal spline 210 is formed in the side gear 145 adjacent the central passage 205 to facilitate such coupling of the side gear 145 to the right-side or left-side drive wheel of the vehicle. The side gear 145 includes gear teeth 215. In some embodiments, the gear teeth 215 are beveled. A bearing surface 220 is formed in the side gear 145, opposite the gear teeth 215. In some embodiments, the bearing surface 220 is planar. The bearing 150 and the washer 155 are adapted to mate with the bearing surface 220 of the side gear 145 to accommodate rotation and/or thrust applied to the side gear 145 during operation. A boss 221 projects outwardly from the side gear 145, opposite the gear teeth 215. In some embodiments, the side gear 160, the bearing 165, and the washer 170 are identical to the side gear 145, the bearing 150, and the washer 155, respectively, and, therefore, will not be described in further detail.

Figure 3:
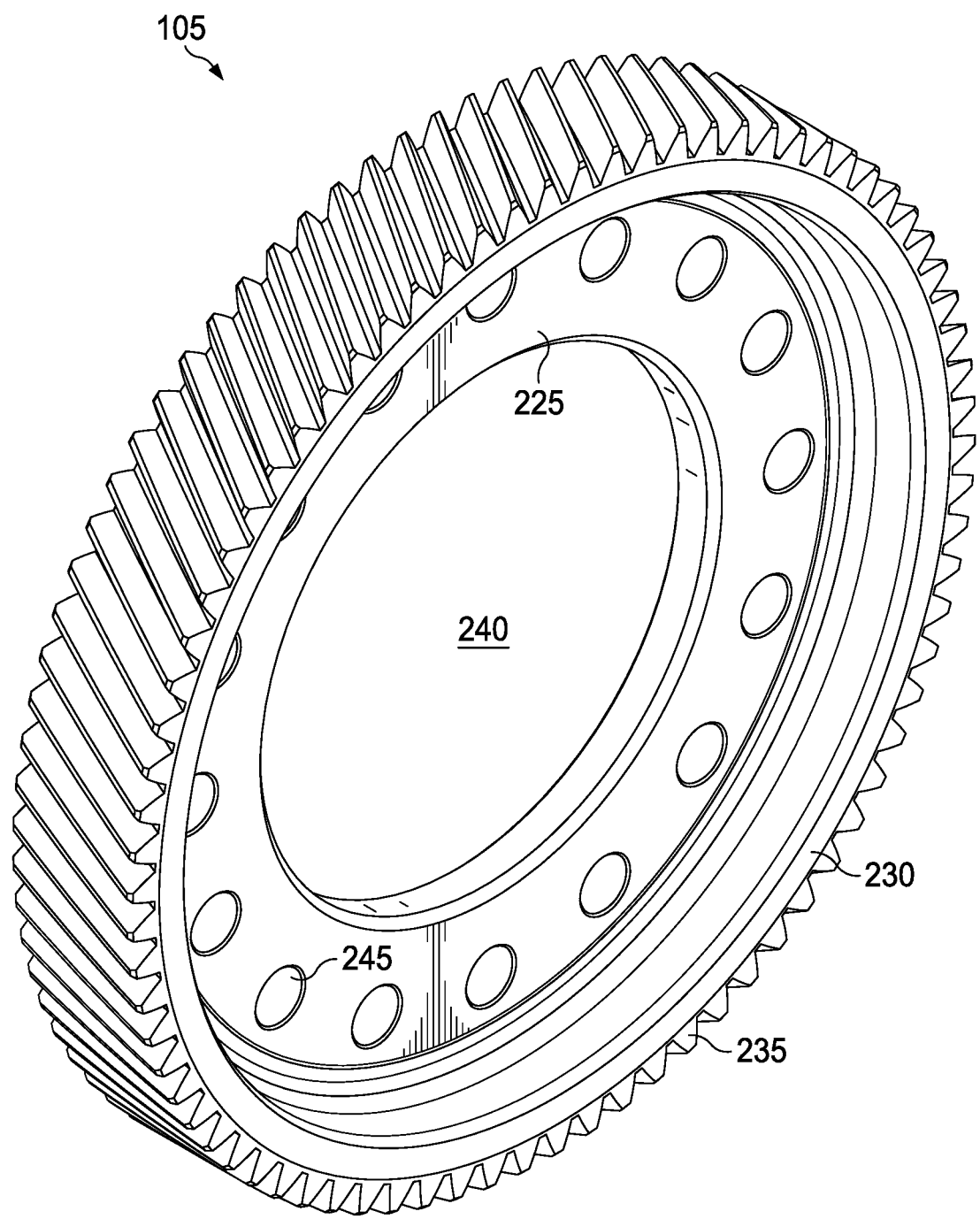
FIG. 3 is a perspective view of the ring gear of FIG. 1, according to one or more embodiments of the present disclosure.

Referring to FIG. 3, with continuing reference to FIG. 1, in an embodiment, the ring gear 105 is adapted to be coupled to the vehicle's transmission via a shaft. The ring gear 105 includes a hub 225, a rim 230, and gear teeth 235. The hub 225 is connected interiorly to the rim 230. A central passage 240 is formed in through the hub 225. A bolt-hole circle 245 is formed in the hub 225 around the central passage 240 to facilitate coupling of the ring gear 105 to the differential housing 110. The gear teeth 235 extend outwardly from the rim 230, opposite the hub 225. In some embodiments, the gear teeth 235 are helical.

Figure 4A:
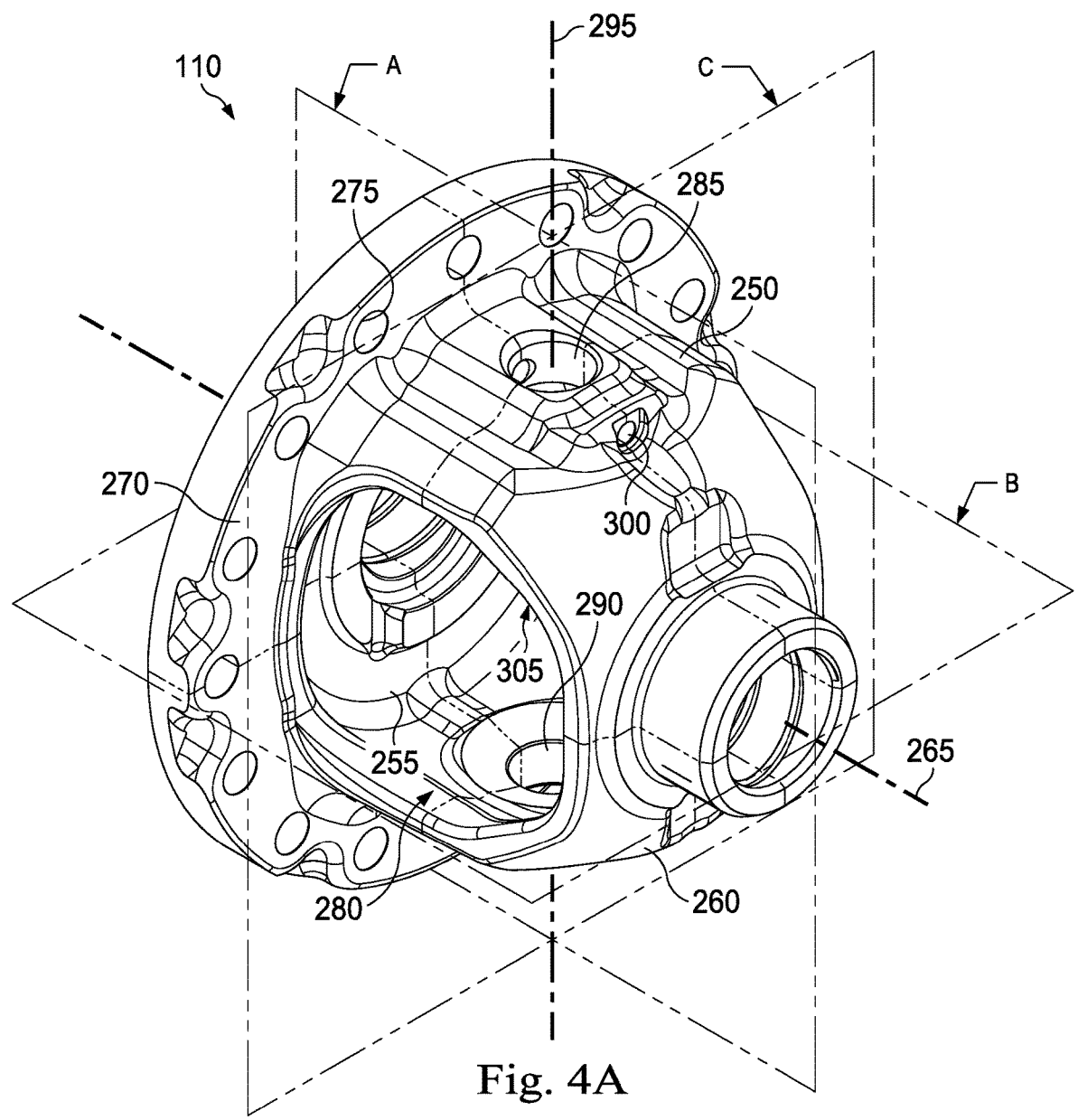
FIG. 4A is a perspective view of the first differential housing of FIG. 1, according to one or more embodiments of the present disclosure.

Referring to FIG. 4A, in an embodiment, the differential housing 110 includes a peripheral wall 250 and opposing end walls 255 and 260. The peripheral wall 250 generally forms a tubular shape about a rotational axis 265 of the differential housing 110. The end wall 255 is connected to the peripheral wall 250. A flange 270 projects radially outwardly from the end wall 255. A bolt-hole circle 275 is formed in the flange 270. The end wall 260 is connected to the peripheral wall 250, opposite the end wall 255. In some embodiments, the peripheral wall 250 is integrally formed with the end wall 255, the end wall 260, or both. The end walls 255 and 260 are spaced apart along the rotational axis 265. As a result, the peripheral wall 250 and the end walls 255 and 260, in combination, define an internal cavity 280 of the differential housing 110. The differential housing 110 also includes openings 285 and 290 formed along a pinion axis 295, through opposing portions of the peripheral wall 250, and into the internal cavity 280. The pinion axis 295 is perpendicular to the rotational axis 265. A pin-hole 300 is formed through the peripheral wall 250 and into the opening 285. A window 305 is also formed through the peripheral wall 250 and into the internal cavity 280.

Figure 4B:
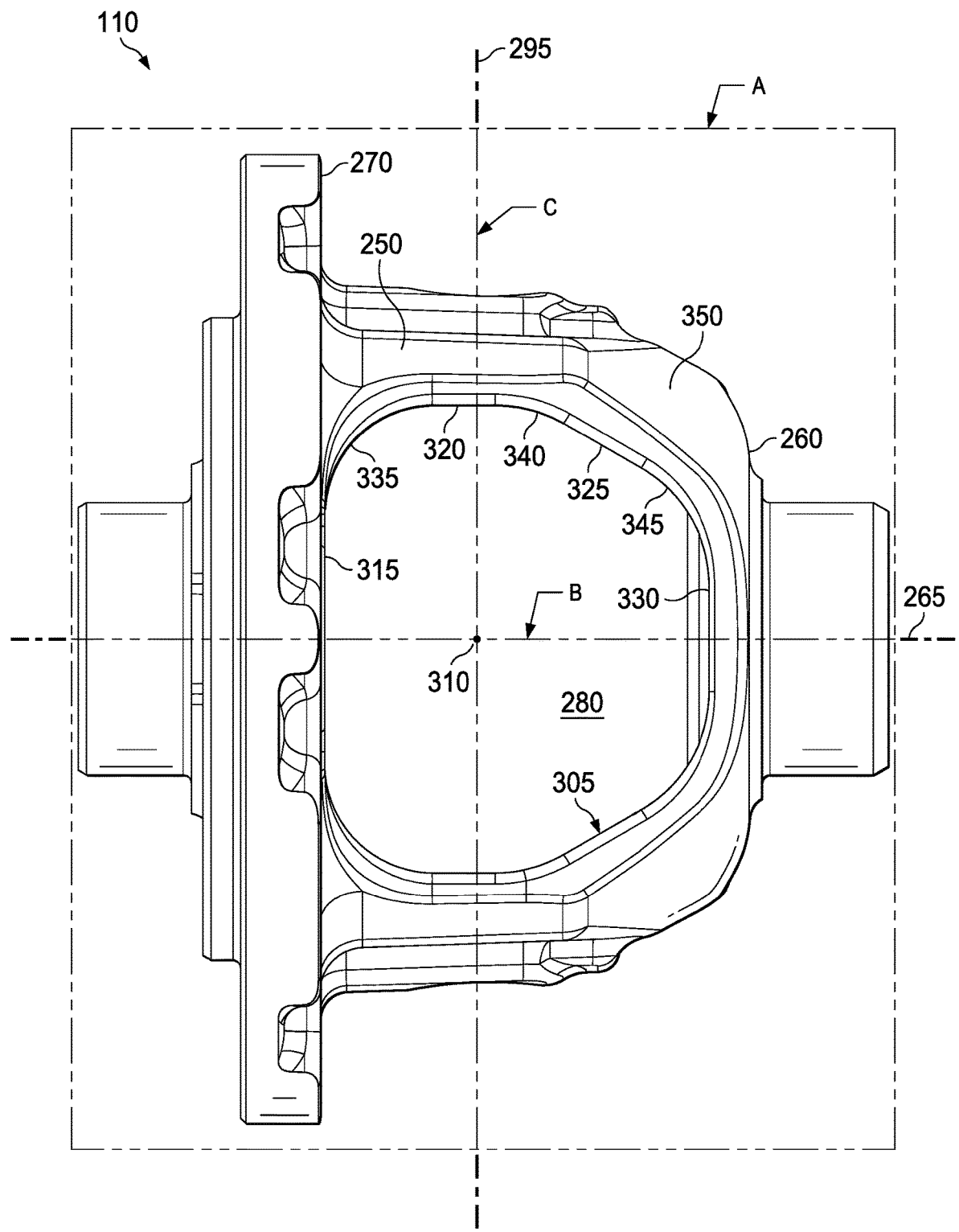
FIG. 4B is a left side elevational view of the first differential housing of FIG. 1, according to one or more embodiments of the present disclosure.

Referring to FIG. 4B, with continuing reference to FIG. 4A, in an embodiment, when projected perpendicularly onto a plane A that includes both the rotational axis 265 and the pinion axis 295, the window 305 defines a first shape. In some embodiments, the first shape defined by the window 305 when projected perpendicularly onto the plane A: is symmetrical about a plane B that includes the rotational axis 265 and extends perpendicular to the pinion axis 295; and is asymmetrical about other planes, including a plane C that includes the pinion axis 295 and extends perpendicular to the rotational axis 265. In some embodiments, the first shape defined by the window 305 when projected perpendicularly onto the plane A is rotationally asymmetrical about a center point 310 defined at an intersection between the rotational axis 265 and the pinion axis 295. In some embodiments, the first shape defined by the window 305 when projected perpendicularly onto the plane A includes straight portions 315, 320, 325, and 330 and outwardly convex portions 335, 340, and 345 mirrored on the opposite sides of the plane B. The straight portion 315 is positioned proximate the end wall 255. The outwardly convex portion 335 extends from the straight portion 315. The straight portion 320 extends from the outwardly convex portion 335, opposite the straight portion 315. In some embodiments, the straight portion 320 is perpendicular to the straight portion 315. The outwardly convex portion 340 extends from the straight portion 320, opposite the outwardly convex portion 335. The straight portion 325 extends from the outwardly convex portion 340, opposite the straight portion 320. The outwardly convex portion 345 extends from the straight portion 325, opposite the outwardly convex portion 340. The straight portion 330 extends from the outwardly convex portion 345, opposite the straight portion 325. The straight portion 330 is positioned proximate the end wall 260. In some embodiments, the straight portion 330 is perpendicular to the straight portion 320. In some embodiments, the straight portion 330 is parallel to the straight portion 315.

In some embodiments, on a side of the plane C proximate the end wall 255, the first shape defined by the window 305 when projected perpendicularly onto the plane A is either entirely outwardly convex or entirely both outwardly convex and straight. Stated another way, in some embodiments, at least on the side of the plane C proximate the end wall 255, the first shape defined by the window 305 when projected perpendicularly onto the plane A is devoid of any outwardly concave or inwardly convex portions.

Figure 4C:
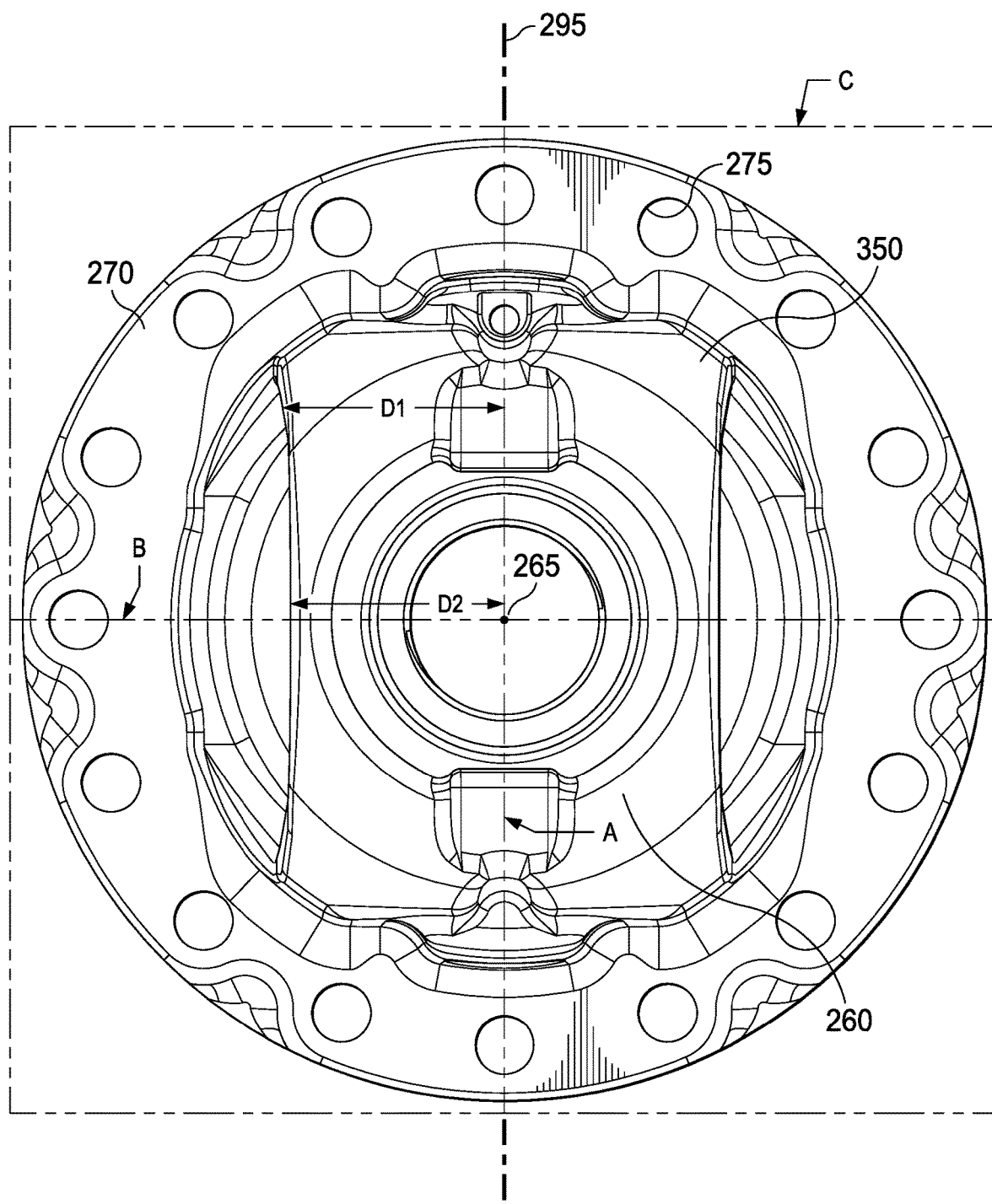
FIG. 4C is a front elevational view of the first differential housing of FIG. 1, according to one or more embodiments of the present disclosure.
Figure 4D:
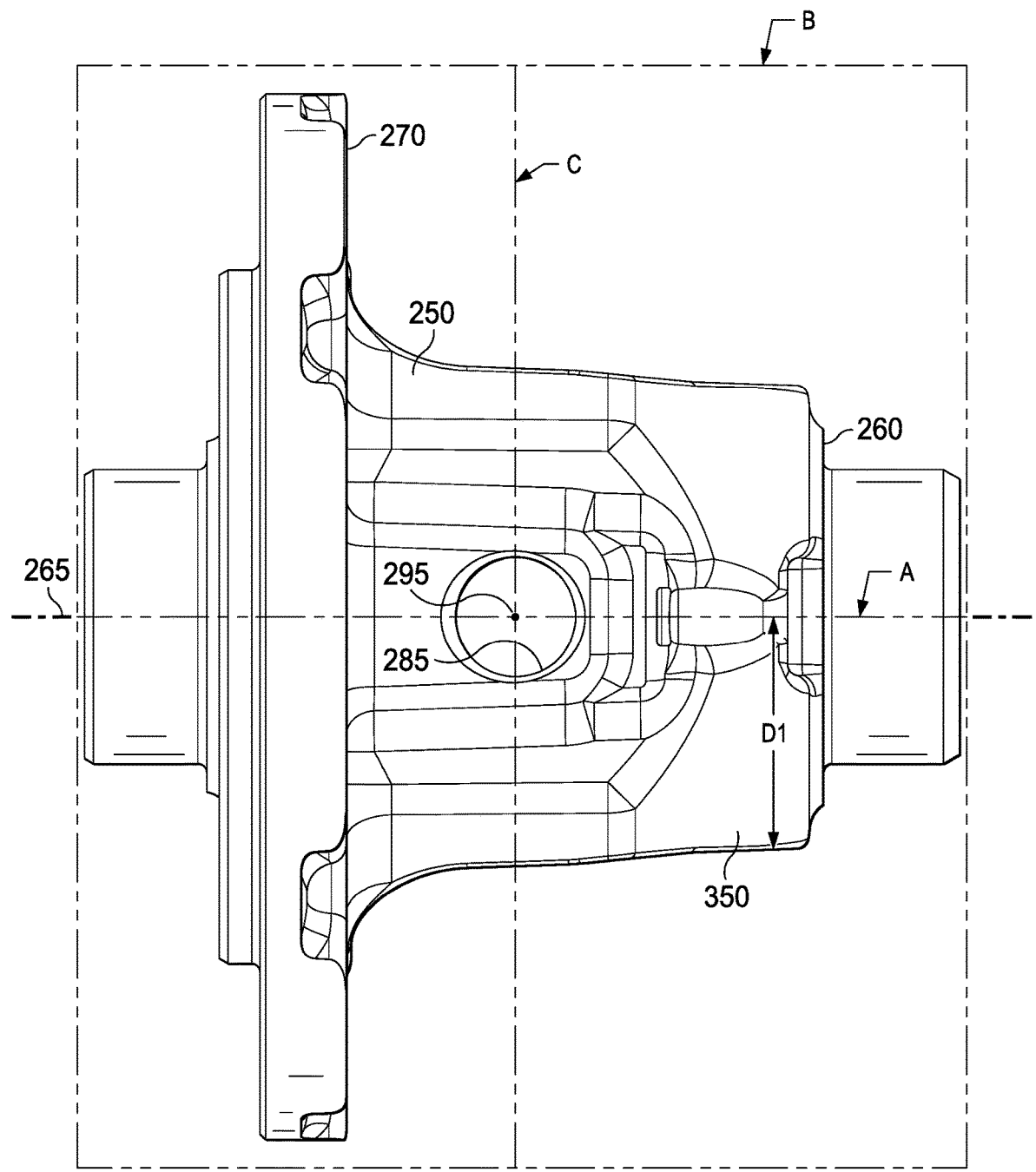
FIG. 4D is a top plan view of the first differential housing of FIG. 1, according to one or more embodiments of the present disclosure.

Referring to FIGS. 4C and 4D, with continuing reference to FIGS. 4A and 4B, in an embodiment, a transitional region 350 is defined in the differential housing 110 where the end wall 260 meets the peripheral wall 250. The transitional region 350 has a dimension D1 measured perpendicularly from the plane A. Moreover, as shown in FIG. 4C, the end wall 260 has a dimension D2 measured perpendicularly from the plane A. In some embodiments, the dimension D2 is less than or equal to the dimension D1. As shown in FIG. 4D, the peripheral wall 250 tapers inwardly toward the plane A from the end wall 255 to the end wall 260.

Figure 4E:
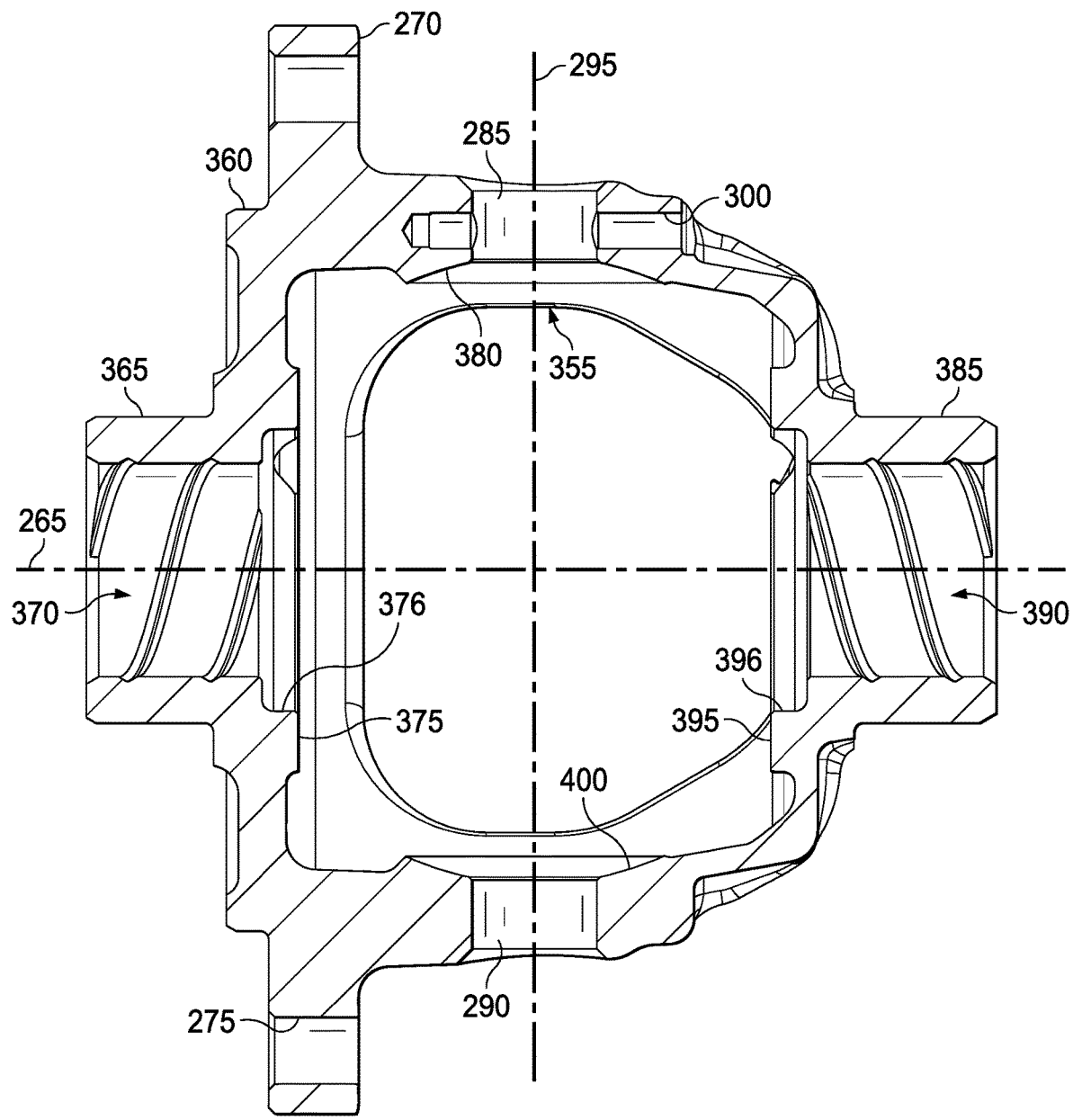
FIG. 4E is a cross-sectional view of the first differential housing of FIG. 1 taken along the line 4D-4D in FIG. 4C, according to one or more embodiments of the present disclosure.

Referring to FIG. 4E, with continuing reference to FIGS. 4A-4D, in an embodiment, the differential housing 110 also includes a window 355 formed through the peripheral wall 250 and into the internal cavity 280, opposite the window 305. The window 355 mirrors the window 305 and, therefore, will not be described in further detail. A boss 360 projects outwardly from the end wall 255 along the rotational axis 265. A boss 365 having a smaller diameter than the boss 360 projects outwardly from the boss 360 along the rotational axis 265. A central passage 370 is formed along the rotational axis 265, through the boss 365, through the boss 360, through the end wall 255, and into the internal cavity 280. A bearing surface 375 is formed in the end wall 255, opposite the bosses 360 and 365, and around the central passage 370. In some embodiments, the bearing surface 375 is planar. A counterbore 376 is formed between the bearing surface 375 and the central passage 370. A bearing surface 380 is also formed in an interior of the peripheral wall 250 around the opening 285. In some embodiments the bearing surface 380 is spherical. A boss 385 projects outwardly from the end wall 260 along the rotational axis 265. A central passage 390 is formed along the rotational axis 265, through the boss 385, through the end wall 260, and into the internal cavity 280. A bearing surface 395 is formed in the end wall 255, opposite the boss 385, and around the central passage 390. In some embodiments, the bearing surface 395 is planar. A counterbore 396 is formed between the bearing surface 395 and the central passage 390. A bearing surface 400 is also formed in an interior of the peripheral wall 250 around the opening 290. In some embodiments the bearing surface 400 is spherical.

Figure 5:
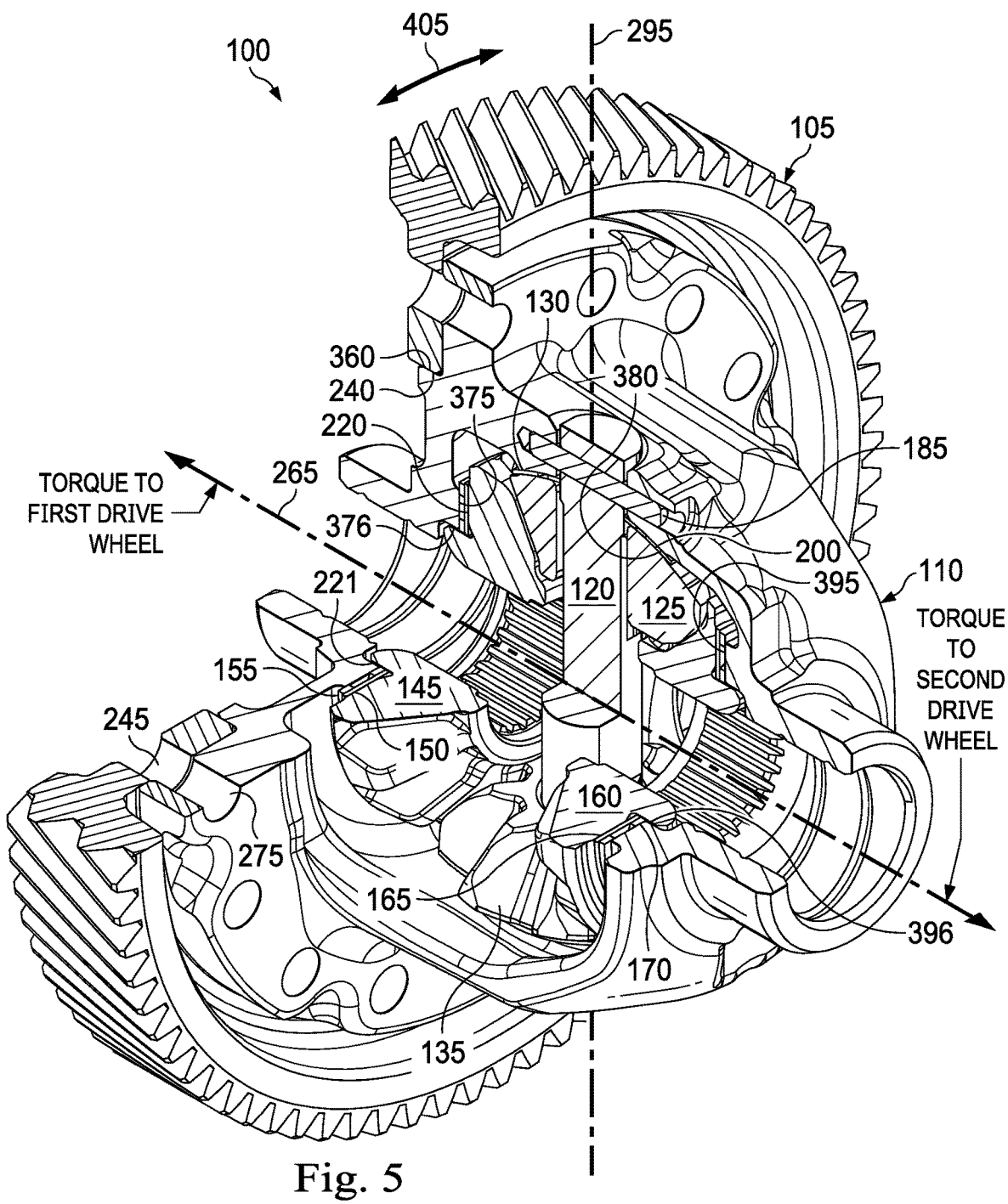
FIG. 5 is a sectional view of the differential assembly of FIG. 1, according to one or more embodiments of the present disclosure.

Referring to FIG. 5, with continuing reference to FIGS. 1, 2, 3, and 4A-4E, the differential assembly 100 is illustrated in an assembled state. As shown in FIG. 5, the boss 360 of the differential housing 110 extends within the central passage 240 of the ring gear 105 to align the bolt-hole circles 245 and 275. A plurality of bolts (not shown) extend through the bolt-hole circles 245 and 275 to secure the ring gear 105 to the differential housing 110. The opposing end portions 175a and 175b of the shaft 120 support the pinion gears 125 and 135. The shaft 120, in turn, is supported within the openings 285 and 290 of the differential housing 110. The pin 185 extends within the opening 180 in the shaft 120 and the pin-hole 300 in the peripheral wall 250 to secure the shaft 120 within the internal cavity 280 of the differential housing 110. The pinion gears 125 and 135 are spaced apart along the pinion axis 295. The washer 130 is compressed between the bearing surface 200 of the pinion gear 125 and the bearing surface 380 of the differential housing 110 to accommodate rotation and/or thrust applied to the pinion gear 125 during operation. The washer 140 is similarly compressed between the pinion gear 135 and the bearing surface 400 of the differential housing 110 to accommodate rotation and/or thrust applied to the pinion gear 135 during operation. The side gears 145 and 160 are spaced apart along the rotational axis 265. The side gears 145 and 160 each mate with both of the pinion gears 125 and 135 and to transmit torque to the drive wheels of the vehicle, as indicated by arrows in FIG. 5. The shaft 120 extends between the side gears 145 and 160. The bearing 150 and the washer 155 are compressed between the bearing surface 220 of the side gear 145 and the bearing surface 375 of the differential housing 110 to accommodate rotation and/or thrust applied to the side gear 145 during operation. The bearing 165 and the washer 170 are similarly compressed between the side gear 160 and the bearing surface 395 of the differential housing 110 to accommodate rotation and/or thrust applied to the side gear 160 during operation. In addition, the boss 221 of the side gear 145 is received within the counterbore 376 to rotationally support the side gear 145 within the differential housing 110 during operation. The side gear 160 is similarly received within the counterbore 396 to rotationally support the side gear 160 within the differential housing 110 during operation.

In operation, the ring gear 105 receives a rotational input from the transmission of the vehicle, as indicated by arrow 405 (via a shaft extending between the transmission and the differential assembly 100). The rotational input 405 is transmitted to the differential housing 110, the shaft 120, and the pinion gears 125 and 135, causing the pinion gears 125 and 135 to orbit the rotational axis 265. The orbiting of the pinion gears 125 and 135 about the rotational axis 265 imparts rotation to the side gears 145 and 160 as well, while, at the same time, allowing the side gears 145 and 160 to rotate at different speeds (via rotation of the pinion gears 125 and 135 about the pinion axis 295). Finally, the rotation imparted to the side gears 145 and 160 by the orbiting of the pinion gears 125 and 135 is transmitted to the drive wheels (via additional shafts extending between the differential assembly 100 and the drive wheels).

Figure 6A:
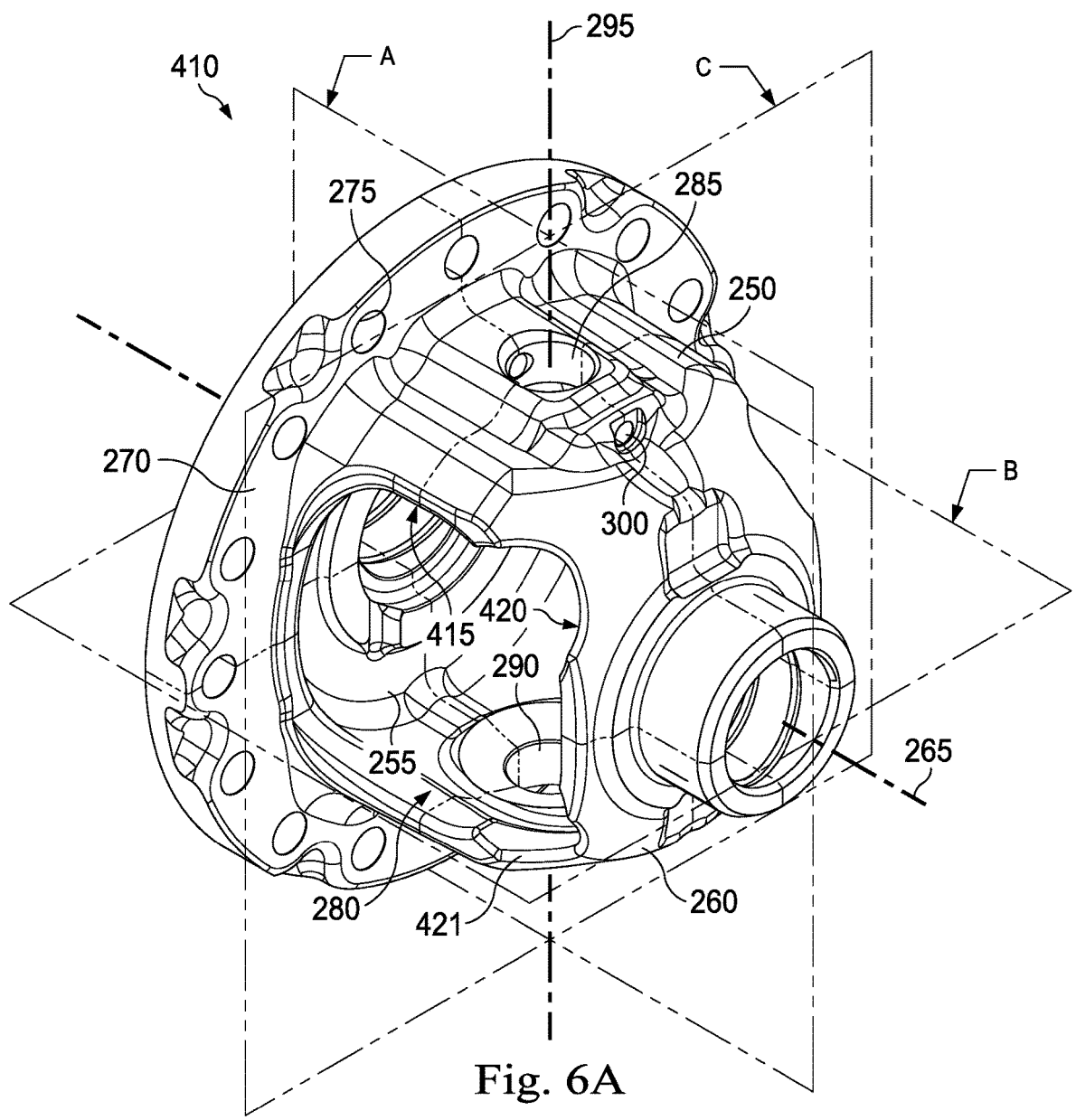
FIG. 6A is a perspective view of a second differential housing configured to be substituted in place of the first differential housing of FIG. 1 to form part of the differential assembly of FIG. 1, according to one or more embodiments of the present disclosure.

Referring to FIG. 6A, in an embodiment, the differential housing 110 is omitted from the differential assembly 100 and replaced with a differential housing 410. The differential housing 410 includes several features that are identical to corresponding features of the differential housing 110, which identical features are given the same reference numerals. The window 305 is omitted from the differential housing 410 and replaced with a window 415 formed through the peripheral wall 250 and into the internal cavity 280. The window 415 includes a central portion 416 and ear portions 420 and 421 adjoining the central portion 416 and extending outwardly therefrom.

Figure 6B:
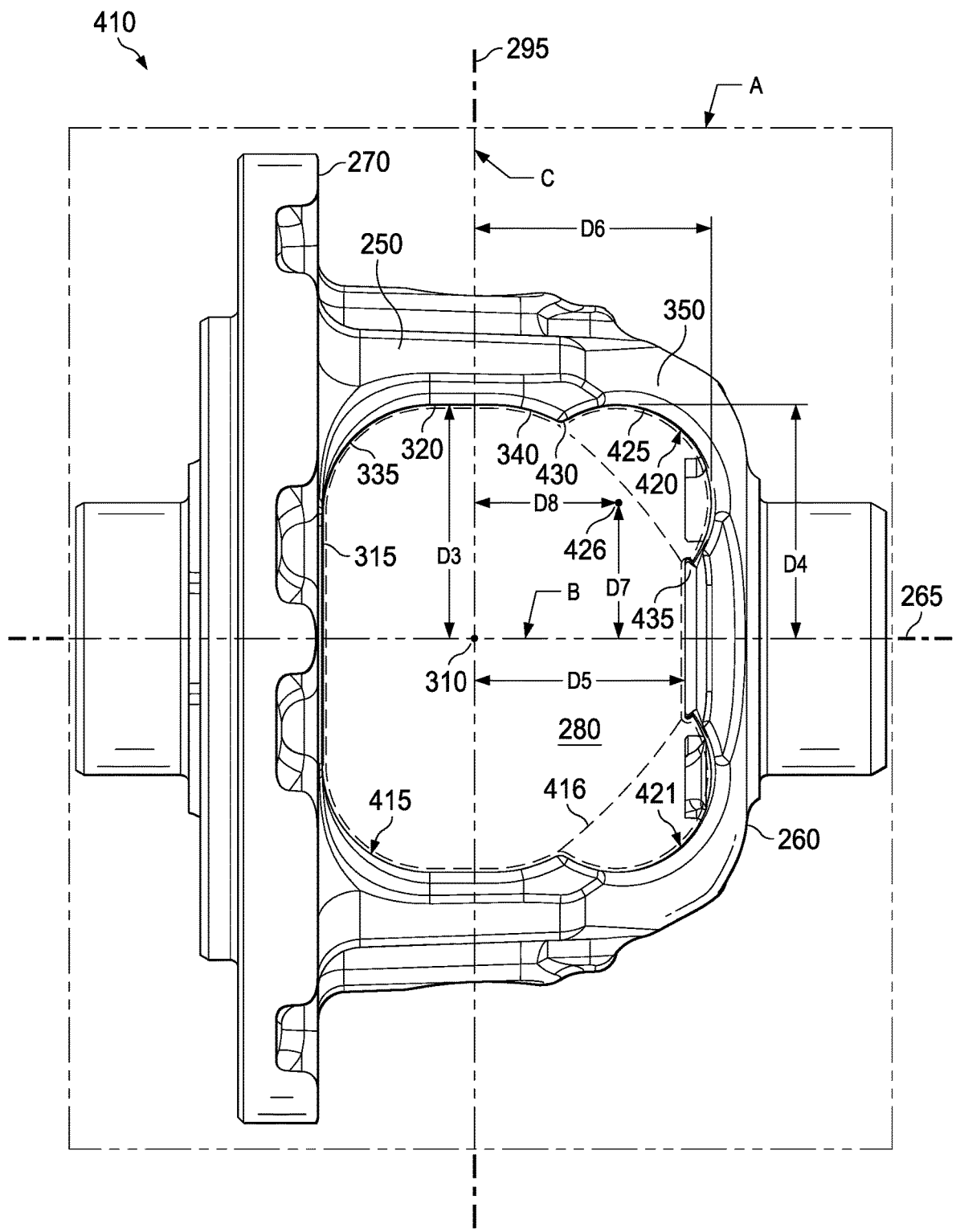
FIG. 6B is a left side elevational view of the second differential housing of FIG. 6A, according to one or more embodiments of the present disclosure.

Turning to FIG. 6B, with continuing reference to FIG. 6A, in an embodiment, when projected perpendicularly onto the plane A that includes both the rotational axis 265 and the pinion axis 295, the window 415 defines a second shape. In some embodiments, the second shape defined by the window 415 when projected perpendicularly onto the plane A: is symmetrical about the plane B that includes the rotational axis 265 and extends perpendicular to the pinion axis 295; and is asymmetrical about other planes, including the plane C that includes the pinion axis 295 and extends perpendicular to the rotational axis 265. In some embodiments, on a side of the plane C proximate the end wall 255, the second shape defined by the window 415 when projected perpendicularly onto the plane A is either entirely outwardly convex or entirely both outwardly convex and straight.

Stated another way, in some embodiments, at least on the side of the plane C proximate the end wall 255, the second shape defined by the window 415 when projected perpendicularly onto the plane A is devoid of any outwardly concave or inwardly convex portions. In some embodiments, the second shape defined by the window 415 when projected perpendicularly onto the plane A is rotationally asymmetrical about the center point 310 defined at the intersection between the rotational axis 265 and the pinion axis 295.

Furthermore, the second shape defined by the window 415 when projected perpendicularly onto the plane A includes the outwardly convex portion 335 and the straight portions 315, 320, and 330 mirrored on the opposite sides of the plane B. However, unlike the window 305, the window 415 includes the ear portion 420 formed in the transitional region 350, the peripheral wall 250, and/or the end wall 260. In some embodiments, the ear portion 420 eliminates the straight portion 325 and at least respective portions of the outwardly convex portions 340 and 345 from the second shape defined by the window 415 when projected perpendicularly onto the plane A. The ear portion 420 defines an outwardly convex portion 425 of the second shape when projected perpendicularly onto the plane A. At least a portion of the window 415 has a dimension D3 measured perpendicularly from the plane B at the center point 310. At least a portion of the window 415 has a dimension D4 measured perpendicularly from the plane B at the ear portion 420. In some embodiments, the dimension D3 is less than the dimension D4. At least a portion of the window 415 has a dimension D5 measured perpendicularly from the plane C at the center point 310. At least a portion of the window 415 has a dimension D6 measured perpendicularly from the plane C at the ear portion 420. In some embodiments, the dimension D5 is less than the dimension D6. In some embodiments, the outwardly convex portion 425 is an arc of a circle having a center point 426. The center point 426 is spaced apart from the plane B by a dimension D7 measured perpendicularly from the plane B. In some embodiments, the dimension D7 is greater than one-half of the dimension D4. The center point 426 is spaced apart from the plane C by a dimension D8 measured perpendicularly from the plane C. In some embodiments, the dimension D8 is greater than one-half of the dimension D6. In some embodiments, the dimension D7 is less than the dimension D8.

The ear portion 420 adjoins the central portion 416 so that the ear portion 420 and the central portion 416, in combination, define opposing inwardly convex surfaces 430 and 435 in the differential housing. As a result, a first inwardly convex portion of the second shape is defined, when projected perpendicularly onto the plane A, where the outwardly convex portion 425 meets a remaining portion of the outwardly convex portion 340 (or the straight portion 320), that is, where the inwardly convex surface 430 is projected perpendicularly onto the plane A. As a further result, a second inwardly convex portion of the second shape is defined, when projected perpendicularly onto the plane A, where the outwardly convex portion 425 meets the straight portion 330 (or a remaining portion of the outwardly convex portion 345), that is, where the inwardly convex surface 435 is projected perpendicularly onto the plane A. An ear portion 421 is also formed in the transitional region 350. The ear portion 421 mirrors the ear portion 420 on the opposite side of the plane B, and, therefore, will not be described in further detail.

Figure 6C:
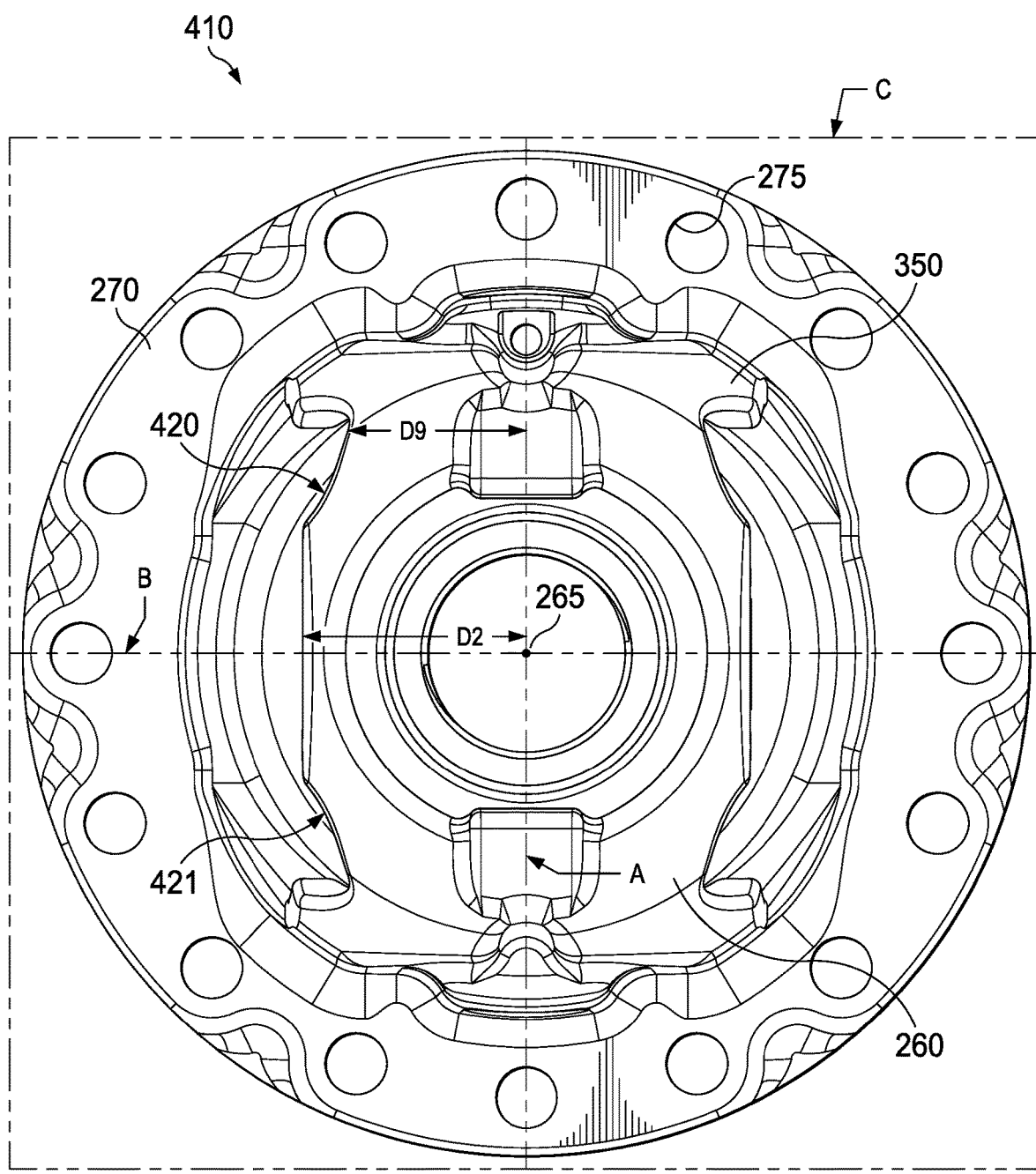
FIG. 6C is a front elevational view of the second differential housing of FIG. 6A, according to one or more embodiments of the present disclosure.
Figure 6D:
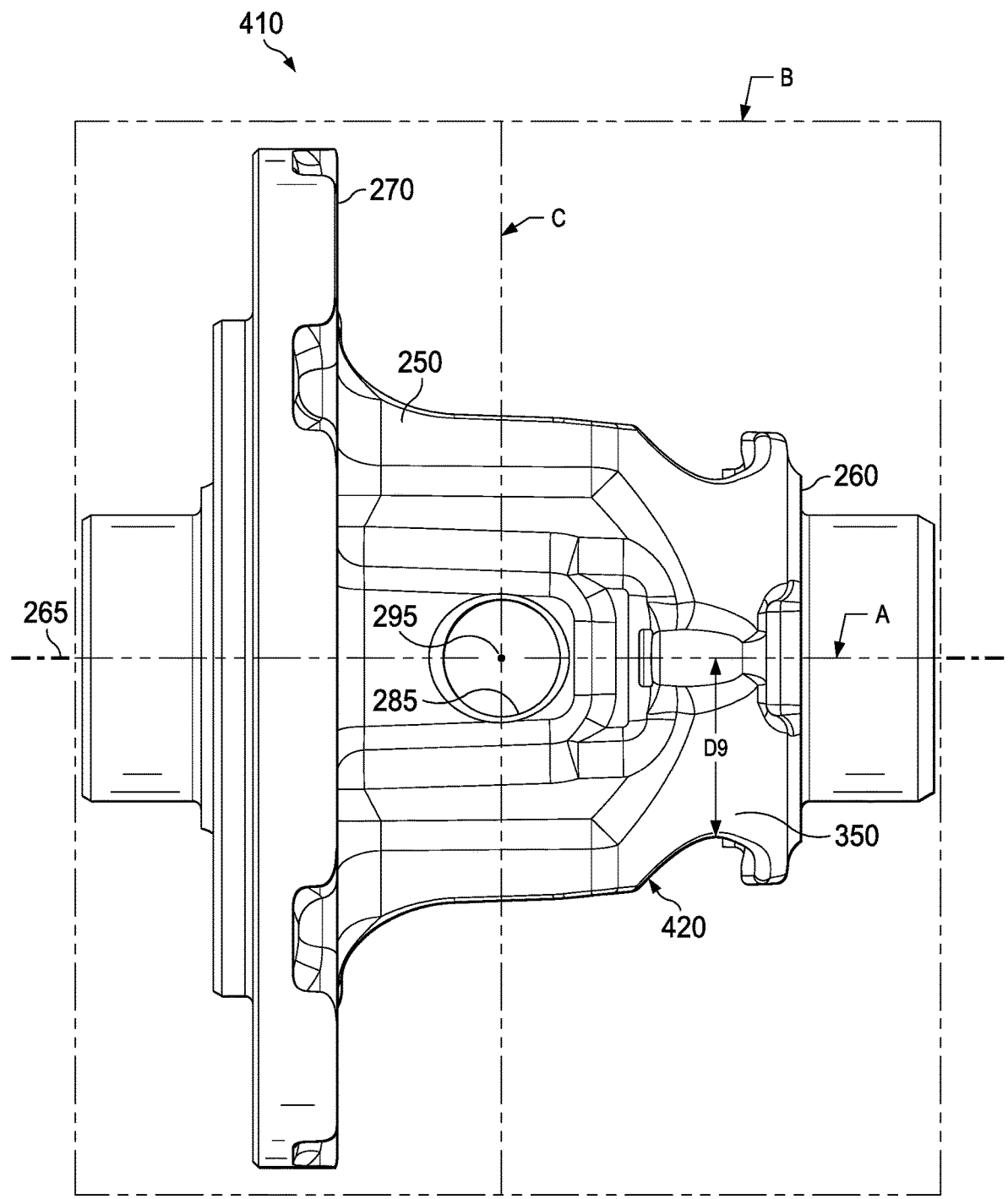
FIG. 6D is a top plan view of the second differential housing of FIG. 6A, according to one or more embodiments of the present disclosure.

Referring to FIGS. 6C and 6D, with continuing reference to FIGS. 6A and 6B, in an embodiment, due to the formation of the ear portion 420 in the transitional region 350, the peripheral wall 250, and/or the end wall 260, at least a portion of the differential housing 410 has a dimension D9 measured perpendicularly from the plane A at the ear portion 420. In some embodiments, the dimension D9 is less than the dimension D1. In some embodiments, the dimension D9 is less than the dimension D1 by 20%, more than 20%, between 20% and 25%, 25%, or more than 25%.

Figure 6E:
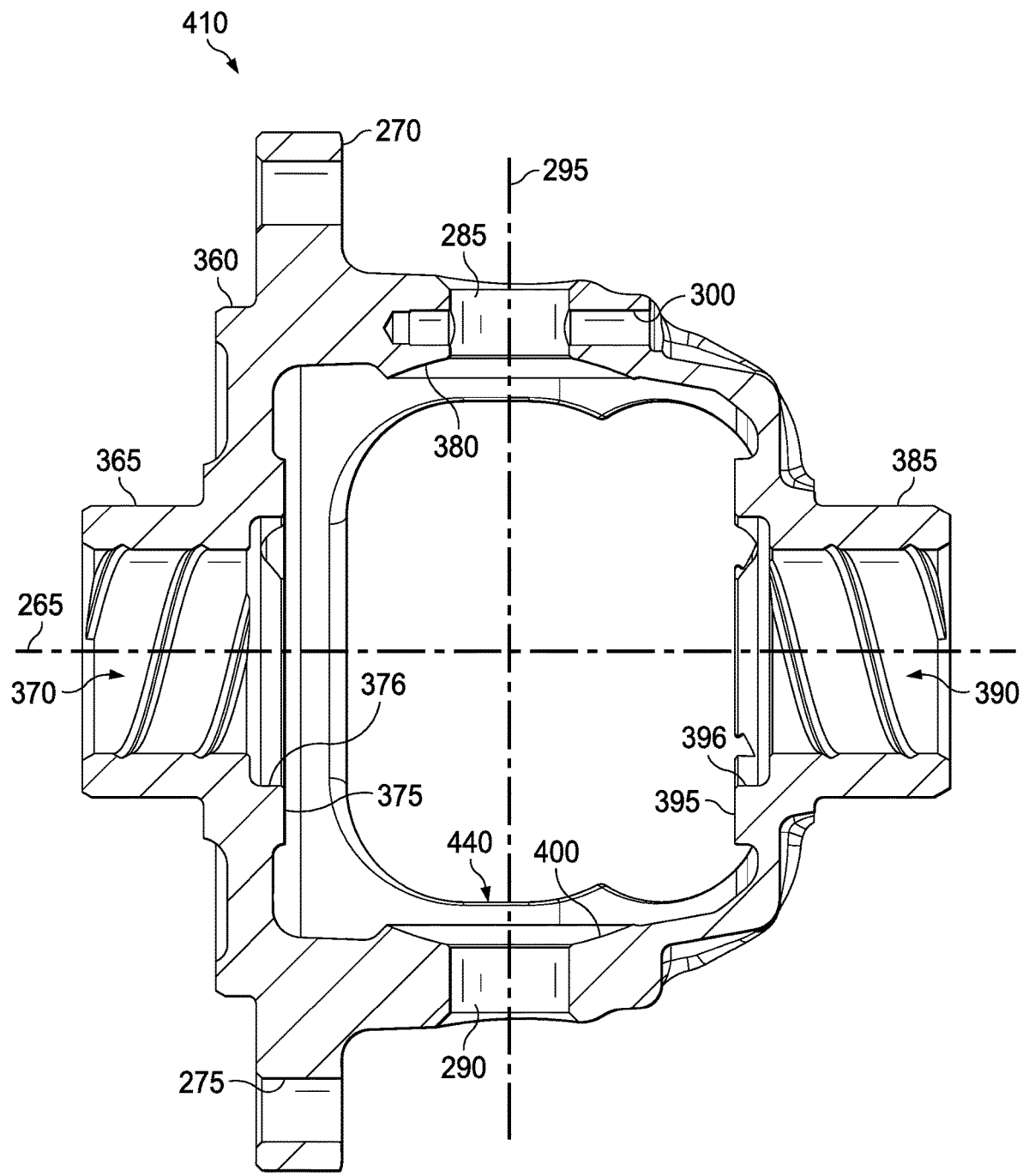
FIG. 6E is a cross-section view of the second differential housing of FIG. 6A taken along the line 6D-6D in FIG. 6C, according to one or more embodiments of the present disclosure.

Referring to FIG. 6E, with continuing reference to FIGS. 6A-6D, in an embodiment, the window 355 is also omitted from the differential housing 410 and replaced with a window 440 formed through the peripheral wall 250 and into the internal cavity 280, opposite the window 415. The window 440 mirrors the window 415 and, therefore, will not be described in further detail.

As compared to the differential housing 110, the differential housing 410 targets mass-reduction specifically to areas of relatively low stress concentration to account for non-uniform stress concentration around the windows 415 and 440. In this regard, stress concentrations around the windows 415 and 440 are greater near the flange 270 and smaller near the end of the differential housing 410 opposite the flange 270. For this reason, among others, the removal of mass is targeted toward the end of the differential housing 410 opposite the flange 270. More particularly, the removed portions of the differential assembly 410 are made to look like "ears" (e.g., the ear portions 420 and 421) protruding from adjacent corners of the windows 415 and 440. By targeting mass-reduction specifically to areas of relatively low stress concentration, a similar amount of mass can be removed from the differential housing 410 as that removed using conventional methods (e.g., reduction in overall size and/or uniform material removal around the window(s)) while, at the same time, a lower maximum stress is maintained in the regions surrounding the windows 415 and 440. Alternatively, a greater amount of mass can be removed from the differential housing 410 than that removed using conventional methods while, at the same time, a similar increase in stress is maintained in the regions surrounding the windows 415 and 440. As a result, the differential housing 410 decreases mass, reduces cost, and increases overall vehicle efficiency while maintaining a structural integrity that does not sacrifice torque requirements.

Furthermore, the unique windows 415 and 440 of the differential housing make assembly of the differential assembly 410's internal components easier and/or more efficient by offering unique "ear" location(s) (e.g., the ear portion 420 and 421) for finger placement and/or machine access during the assembly process. Specifically, these unique "ear" locations allow more space for the shaft 120, the pinion gears 125 and 135, and the side gears 145 and 160 to be placed within the internal cavity 280 and assembled. Aside from these advantageous differences, the operation of the differential assembly 100 including the differential housing 410 is substantially the same as the operation of the differential assembly 100 including the differential housing 110, and, therefore, will not be described in further detail.

A differential housing according to a first aspect has been disclosed. The differential housing according to the first aspect generally includes: a peripheral wall; first and second end walls connected to the peripheral wall and spaced apart along a rotational axis so that the peripheral wall and the first and second end walls, in combination, define an internal cavity; a transitional region defined in the differential housing where the second end wall meets the peripheral wall; and a first window formed through the peripheral wall, the transitional region, and/or the second end wall and into the internal cavity, the first window including: a central portion; and first and second ear portions adjoining the central portion and extending outwardly therefrom, wherein the first window defines a shape when projected onto a first plane, wherein the first plane includes both the rotational axis and a pinion axis, wherein the pinion axis extends perpendicular to the rotational axis, wherein the shape is asymmetrical about a second plane, wherein the second plane includes the pinion axis and extends perpendicular to the rotational axis, and wherein, on a side of the second plane proximate the first end wall, the shape is either entirely outwardly convex or entirely both outwardly convex and straight. In one or more embodiments, the first and second ear portions are located on a side of the second plane proximate the second end wall. In one or more embodiments, the shape is symmetrical about a third plane, and the third plane includes the rotational axis and extends perpendicular to the pinion axis. In one or more embodiments, the first window has a first dimension measured perpendicularly from the third plane at a center point where the rotational axis and the pinion axis intersect, the first window has a second dimension measured perpendicularly from the third plane at the first ear portion, and the first dimension is less than the second dimension. In one or more embodiments, the first window has a first dimension measured perpendicularly from the second plane at a center point where the rotational axis and the pinion axis intersect, the first window has a second dimension measured perpendicularly from the second plane at the first ear portion, and the first dimension is less than the second dimension. In one or more embodiments, the shape is rotationally asymmetrical about a center point, and the center point is defined at an intersection between the rotational axis and the pinion axis. In one or more embodiments, the differential housing further includes a flange projecting radially outwardly from the first end wall. In one or more embodiments, the second end wall has a first dimension measured perpendicularly from the first plane, wherein the differential housing has a second dimension measured perpendicularly from the first plane at the first or second ear portion, and the second dimension of the differential housing is less than the first dimension of the second end wall. In one or more embodiments, the second dimension is less than the first dimension by 20% or more. In one or more embodiments, the first ear portion adjoins the central portion so that the first ear portion and the central portion, in combination, define opposing first and second inwardly convex surfaces in the differential housing, and the second ear portion adjoins the central portion so that the second ear portion and the central portion, in combination, define opposing third and fourth inwardly convex surfaces in the differential housing.

A differential housing according to a second aspect has also been disclosed. The differential housing according to the second aspect generally includes: a peripheral wall; first and second end walls connected to the peripheral wall and spaced apart along a rotational axis so that the peripheral wall and the first and second end walls, in combination, define an internal cavity; a transitional region defined in the differential housing where the second end wall meets the peripheral wall; and a first window formed through the peripheral wall, the transitional region, and/or the second end wall and into the internal cavity, the first window comprising: a central portion; and first and second ear portions adjoining the central portion and extending outwardly therefrom, wherein a first plane includes both the rotational axis and a pinion axis, wherein the pinion axis extends perpendicular to the rotational axis, wherein a second plane includes the pinion axis and extends perpendicular to the rotational axis, wherein a third plane includes the rotational axis and extends perpendicular to the pinion axis, and wherein: the first window has a first dimension measured perpendicularly from the third plane at a center point where the rotational axis and the pinion axis intersect, the first window has a second dimension measured perpendicularly from the third plane at the first ear portion, and the first dimension is less than the second dimension; or the first window has a third dimension measured perpendicularly from the second plane at the center point, the first window has a fourth dimension measured perpendicularly from the second plane at the first ear portion, and the third dimension is less than the fourth dimension. In one or more embodiments, the first and second ear portions are located on a side of the second plane proximate the second end wall. In one or more embodiments, the first window defines a shape when projected onto the and the shape is asymmetrical about the second plane. In one or more embodiments, the shape is symmetrical about the third plane. In one or more embodiments, the first ear portion adjoins the central portion so that the first ear portion and the central portion, in combination, define opposing first and second inwardly convex surfaces in the differential housing, and the second ear portion adjoins the central portion so that the second ear portion and the central portion, in combination, define opposing third and fourth inwardly convex surfaces in the differential housing. In one or more embodiments, the shape is rotationally asymmetrical about a center point, and the center point is defined at an intersection between the rotational axis and the pinion axis. In one or more embodiments, the differential housing further includes a flange projecting radially outwardly from the first end wall.

A differential housing according to a third aspect has also been disclosed. The differential housing according to the third aspect generally includes: a peripheral wall; first and second end walls connected to the peripheral wall and spaced apart along a rotational axis so that the peripheral wall and the first and second end walls, in combination, define an internal cavity; a transitional region defined in the differential housing where the second end wall meets the peripheral wall; and a first window formed through the peripheral wall, the transitional region, and/or the second end wall and into the internal cavity, the first window including: a central portion; and first and second ear portions adjoining the central portion and extending outwardly therefrom, wherein the second end wall has a first dimension measured perpendicularly from a plane, wherein the plane includes both the rotational axis and a pinion axis, wherein the pinion axis extends perpendicular to the rotational axis, wherein the differential housing has a second dimension measured perpendicularly from the plane at the first or second ear portion, and wherein the second dimension is less than the first dimension. In one or more embodiments, the second dimension is less than the first dimension by 20% or more. In one or more embodiments, the second dimension is less than the first dimension by 25% or more. In one or more embodiments, a second plane includes the pinion axis and extends perpendicular to the rotational axis, wherein a third plane includes the rotational axis and extends perpendicular to the pinion axis, and wherein: the first window has a third dimension measured perpendicularly from the third plane at a center point where the rotational axis and the pinion axis intersect, the first window has a fourth dimension measured perpendicularly from the third plane at the first ear portion, and the third dimension is less than the fourth dimension; or the first window has a fifth dimension measured perpendicularly from the second plane at the center point, the first window has a sixth dimension measured perpendicularly from the second plane at the first ear portion, and the fifth dimension is less than the sixth dimension. In one or more embodiments, the first window defines a shape when projected onto the first plane, the shape is rotationally asymmetrical about a center point, and the center point is defined at an intersection between the rotational axis and the pinion axis. In one or more embodiments, the differential housing further includes a flange projecting radially outwardly from the first end wall. In one or more embodiments, the first ear portion adjoins the central portion so that the first ear portion and the central portion, in combination, define opposing first and second inwardly convex surfaces in the differential housing, and the second ear portion adjoins the central portion so that the second ear portion and the central portion, in combination, define opposing third and fourth inwardly convex surfaces in the differential housing.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A differential housing, comprising:
   a peripheral wall;
   first and second end walls connected to the peripheral wall and spaced apart along a rotational axis so that the peripheral wall and the first and second end walls, in combination, define an internal cavity;
   a transitional region defined in the differential housing where the second end wall meets the peripheral wall; and
   a first window formed through the peripheral wall, the transitional region, and/or the second end wall and into the internal cavity, the first window comprising:
   a central portion; and
   first and second ear portions adjoining the central portion and extending outwardly therefrom,
   wherein the first window defines a shape when projected perpendicularly onto a first plane,
   wherein the first plane includes both the rotational axis and a pinion axis,
   wherein the pinion axis extends perpendicular to the rotational axis,
   wherein the shape is asymmetrical about a second plane,
   wherein the second plane extends perpendicular to the rotational axis,
   wherein the second plane includes the pinion axis,
   wherein the first and second ear portions are located on a side of the second plane proximate the second end wall,
   wherein the first ear portion adjoins the central portion so that the first ear portion and the central portion, in combination, define opposing first and second inwardly convex surfaces in the differential housing, and
   wherein the first and second inwardly convex surfaces are both located on the side of the second plane proximate the second end wall, and
   wherein:
   the first window has a first dimension measured perpendicularly in a direction from the second plane at a center point where the rotational axis and the pinion axis intersect,
   the first window has a second dimension measured perpendicularly in the direction from the second plane at the first ear portion, and
   the first dimension is less than the second dimension.

2. The differential housing of claim 1, further comprising a flange projecting radially outwardly from the first end wall.

3. The differential housing of claim 1, wherein the fourth dimension is less than the third dimension by 20% or more.

4. The differential housing of claim 1,
   wherein the second ear portion adjoins the central portion so that the second ear portion and the central portion, in combination, define opposing third and fourth inwardly convex surfaces in the differential housing.

5. The differential housing of claim 1,
   wherein, on a side of the second plane proximate the first end wall, the shape is either entirely outwardly convex or entirely both outwardly convex and straight.

6. The differential housing of claim 5, wherein the shape is symmetrical about a third plane, and
   wherein the third plane includes the rotational axis and extends perpendicular to the pinion axis.

7. A differential housing, comprising:
   a peripheral wall;
   first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom,
wherein the first window defines a shape when projected perpendicularly onto a first plane,
wherein the first plane includes both the rotational axis and a pinion axis,
wherein the pinion axis extends perpendicular to the rotational axis,
wherein the shape is asymmetrical about a second plane,
wherein the second plane includes the pinion axis and extends perpendicular to the rotational axis,
wherein, on a side of the second plane proximate the first end wall, the shape is either entirely outwardly convex or entirely both outwardly convex and straight,
wherein the first and second ear portions are located on a side of the second plane proximate the second end wall,
wherein the first ear portion adjoins the central portion,
wherein the shape is symmetrical about a third plane,
wherein the third plane includes the rotational axis and extends perpendicular to the pinion axis, and
wherein:
the first window has a first dimension measured perpendicularly in a direction from the second plane at a center point where the rotational axis and the pinion axis intersect,
the first window has a second dimension measured perpendicularly in the direction from the second plane at the first ear portion, and
the first dimension is less than the second dimension.

8. A differential housing, comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom,
wherein a first plane includes both the rotational axis and a pinion axis,
wherein the pinion axis extends perpendicular to the rotational axis,
wherein a second plane includes the pinion axis and extends perpendicular to the rotational axis,
wherein the first ear portion adjoins the central portion so that the first ear portion and the central portion, in combination, define opposing first and second inwardly convex surfaces in the differential housing, and
wherein the first and second inwardly convex surfaces are both located on a side of the second plane proximate the second end wall, and wherein:
the first window has a first dimension measured perpendicularly in a direction from the second plane at a center point where the rotational axis and the pinion axis intersect,
the first window has a second dimension measured perpendicularly in the direction from the second plane at the first ear portion, and
the first dimension is less than the second dimension.

9. The differential housing of claim 8,
wherein the second ear portion adjoins the central portion so that the second ear portion and the central portion, in combination, define opposing third and fourth inwardly convex surfaces in the differential housing.

10. The differential housing of claim 8, further comprising a flange projecting radially outwardly from the first end wall.

11. A differential housing, comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom,
wherein:
the first window has a first dimension measured perpendicularly in a direction from a first plane at a center point where the rotational axis and a pinion axis intersect,
the first plane includes the pinion axis and extends perpendicular to the rotational axis,
the first window has a second dimension measured perpendicularly in the direction from the first plane at the first ear portion, and
the first dimension is less than the second dimension;
wherein the first ear portion adjoins the central portion so that the first ear portion and the central portion, in combination, define opposing first and second inwardly convex surfaces in the differential housing.

12. The differential housing of claim 11,
wherein:
the first ear portion is entirely outwardly convex,
the first window has a third dimension measured perpendicularly from a second plane at the center point where the rotational axis and the pinion axis intersect,
the second plane includes the rotational axis and extends perpendicular to the pinion axis,
the first window has a fourth dimension measured perpendicularly from the second plane at the first ear portion, and
the third dimension is less than the fourth dimension.

13. A differential housing, comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and a first window formed through the peripheral wall, the transitional region, and/or the second end wall and into the internal cavity, the first window comprising:
a central portion; and
first and second ear portions adjoining the central portion and extending outwardly therefrom,
wherein the first ear portion adjoins the central portion, and
wherein:
the first window has a first dimension measured perpendicularly in a direction from a first plane at a center point where the rotational axis and the pinion axis intersect,
the first plane includes the pinion axis and extends perpendicular to the rotational axis,
the first window has a second dimension measured perpendicularly in the direction from the first plane at the first ear portion, and
the first dimension is less than the second dimension.

14. The differential housing of claim 13,
wherein:
the first ear portion is entirely outwardly convex,
the first window has a third dimension measured perpendicularly from a second plane at a center point where the rotational axis and the pinion axis intersect,
the second plane includes the rotational axis and extends perpendicular to the pinion axis,
the first window has a fourth dimension measured perpendicularly from the third second plane at the first ear portion, and
the third dimension is less than the fourth dimension.

15. A differential housing, comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom,
wherein the first ear portion adjoins the central portion so that the first ear portion and the central portion, in combination, define opposing first and second inwardly convex surfaces in the differential housing,
wherein a first plane includes both the rotational axis and a pinion axis,
wherein the pinion axis extends perpendicular to the rotational axis,
wherein a second plane includes the pinion axis and extends perpendicular to the rotational axis,
wherein a third plane includes the rotational axis and extends perpendicular to the pinion axis, and
wherein:
the first window has a first dimension measured perpendicularly in a direction from the second plane at a center point where the rotational axis and the pinion axis intersect,
the first window has a second dimension measured perpendicularly in the direction from the second plane at the first ear portion, and
the first dimension is less than the second dimension.

16. The differential housing of claim 15,
wherein:
the first ear portion is entirely outwardly convex,
the first window has a third dimension measured perpendicularly from the third plane at the center point where the rotational axis and the pinion axis intersect,
the first window has a fourth dimension measured perpendicularly from the third plane at the first ear portion, and
the third dimension is less than the fourth dimension.

17. A differential housing, comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom,
wherein the first ear portion adjoins the central portion;
wherein a first plane includes both the rotational axis and a pinion axis;
wherein the pinion axis extends perpendicular to the rotational axis;
wherein a second plane includes the pinion axis and extends perpendicular to the rotational axis;
wherein a third plane includes the rotational axis and extends perpendicular to the pinion axis; and
wherein:
the first window has a first dimension measured perpendicularly in a direction from the second plane at a center point where the rotational axis and the pinion axis intersect;
the first window has a second dimension measured perpendicularly in the direction from the second plane at the first ear portion; and
the first dimension is less than the second dimension.

18. The differential housing of claim 17, wherein the first and second ear portions are located on a side of the second plane proximate the second end wall.

19. The differential housing of claim 17, wherein the first window defines a shape when projected perpendicularly onto the first plane, and wherein the shape is asymmetrical about the second plane.

20. The differential housing of claim 19, wherein the shape is symmetrical about the third plane.

21. A differential housing,
comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:

a central portion; and
first and second ear portions adjoining the central portion and extending outwardly therefrom;
wherein the first window defines a shape when projected perpendicularly onto a first plane;
wherein the first plane includes both the rotational axis and a pinion axis;
wherein the pinion axis extends perpendicular to the rotational axis;
wherein the shape is asymmetrical about a second plane;
wherein the second plane extends perpendicular to the rotational axis;
wherein the second plane includes the pinion axis;
wherein the first and second ear portions are located on a side of the second plane proximate the second end wall;
wherein the first ear portion adjoins the central portion so that the first ear portion and the central portion, in combination, define opposing first and second inwardly convex surfaces in the differential housing;
wherein the first and second inwardly convex surfaces are both located on the side of the second plane proximate the second end wall;
wherein:
(i) the first window has a first dimension measured perpendicularly from the second plane at a center point where the rotational axis and the pinion axis intersect,
the first window has a second dimension measured perpendicularly from the second plane at the first ear portion, and
the first dimension is less than the second dimension; and/or
(ii) the second end wall has a third dimension measured perpendicularly from the first plane,
the second end wall has a fourth dimension measured perpendicularly from the first plane at the first or second ear portion, and
the fourth dimension of the second end wall is less than the third dimension of the second end wall;
wherein (i); and
wherein:
the first ear portion is entirely outwardly convex,
a third plane includes the rotational axis and extends perpendicular to the pinion axis,
the first window has a fifth dimension measured perpendicularly from the third plane at a center point where the rotational axis and the pinion axis intersect,
the first window has a sixth dimension measured perpendicularly from the third plane at the first ear portion, and
the fifth dimension is less than the sixth dimension.

22. A differential housing,
comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom;
wherein the first window defines a shape when projected perpendicularly onto a first plane;
wherein the first plane includes both the rotational axis and a pinion axis;
wherein the pinion axis extends perpendicular to the rotational axis;
wherein the shape is asymmetrical about a second plane;
wherein the second plane includes the pinion axis and extends perpendicular to the rotational axis;
wherein, on a side of the second plane proximate the first end wall, the shape is either entirely outwardly convex or entirely both outwardly convex and straight;
wherein the first and second ear portions are located on a side of the second plane proximate the second end wall;
wherein the first ear portion adjoins the central portion;
wherein the shape is symmetrical about a third plane;
wherein the third plane includes the rotational axis and extends perpendicular to the pinion axis;
wherein:
(i) the first window has a first dimension measured perpendicularly from the second plane at a center point where the rotational axis and the pinion axis intersect,
the first window has a second dimension measured perpendicularly from the second plane at the first ear portion, and
the first dimension is less than the second dimension; and/or
(ii) the second end wall has a third dimension measured perpendicularly from the first plane,
the second end wall has a fourth dimension measured perpendicularly from the first plane at the first or second ear portion, and
the fourth dimension of the second end wall is less than the third dimension of the second end wall;
wherein (i); and
wherein:
the first ear portion is entirely outwardly convex,
the first window has a fifth dimension measured perpendicularly from the third plane at a center point where the rotational axis and the pinion axis intersect,
the first window has a sixth dimension measured perpendicularly from the third plane at the first ear portion, and
the fifth dimension is less than the sixth dimension.

23. A differential housing,
comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
a central portion; and
first and second ear portions adjoining the central portion and extending outwardly therefrom;
wherein a first plane includes both the rotational axis and a pinion axis;

wherein the pinion axis extends perpendicular to the rotational axis;
wherein a second plane includes the pinion axis and extends perpendicular to the rotational axis;
wherein the first ear portion adjoins the central portion so that the first ear portion and the central portion, in combination, define opposing first and second inwardly convex surfaces in the differential housing;
wherein the first and second inwardly convex surfaces are both located on a side of the second plane proximate the second end wall;
wherein:
   (i) the first window has a first dimension measured perpendicularly from the second plane at a center point where the rotational axis and the pinion axis intersect,
      the first window has a second dimension measured perpendicularly from the second plane at the first ear portion, and
      the first dimension is less than the second dimension; and/or
   (ii) the second end wall has a third dimension measured perpendicularly from the first plane,
      the second end wall has a fourth dimension measured perpendicularly from the first plane at the first or second ear portion, and
      the fourth dimension of the second end wall is less than the third dimension of the second end wall;
wherein (i); and
wherein:
   the first ear portion is entirely outwardly convex,
   a third plane includes the rotational axis and extends perpendicular to the pinion axis,
   the first window has a fifth dimension measured perpendicularly from the third plane at a center point where the rotational axis and the pinion axis intersect,
   the first window has a sixth dimension measured perpendicularly from the third plane at the first ear portion,
   the fifth dimension is less than the sixth dimension.

24. A differential housing, comprising:
a peripheral wall;
first and second end walls connected to the peripheral wall and spaced apart along a rotational axis so that the peripheral wall and the first and second end walls, in combination, define an internal cavity;
a transitional region defined in the differential housing where the second end wall meets the peripheral wall; and
a first window formed through the peripheral wall, the transitional region, and/or the second end wall and into the internal cavity, the first window comprising:
   a central portion; and
   first and second ear portions adjoining the central portion and extending outwardly therefrom, wherein the first ear portion adjoins the central portion;
wherein a first plane includes both the rotational axis and a pinion axis;
wherein the pinion axis extends perpendicular to the rotational axis;
wherein a second plane includes the pinion axis and extends perpendicular to the rotational axis;
wherein a third plane includes the rotational axis and extends perpendicular to the pinion axis;
wherein:
   (i) the first window has a first dimension measured perpendicularly from the second plane at the center point;
      the first window has a second dimension measured perpendicularly from the second plane at the first ear portion; and
      the first dimension is less than the second dimension; and/or
   (ii) the second end wall has a third dimension measured perpendicularly from the first plane,
      the second end wall has a fourth dimension measured perpendicularly from the first plane at the first or second ear portion, and
      the fourth dimension of the second end wall is less than the third dimension of the second end wall;
wherein (i); and
wherein:
   the first ear portion is entirely outwardly convex;
   the first window has a fifth dimension measured perpendicularly from the third plane at a center point where the rotational axis and the pinion axis intersect;
   the first window has a sixth dimension measured perpendicularly from the third plane at the first ear portion; and
   the fifth dimension is less than the sixth dimension.

* * * * *